Feb. 19, 1963 F. L. GRANGER 3,078,329
BATTERY ASSEMBLY
Filed Oct. 21, 1960
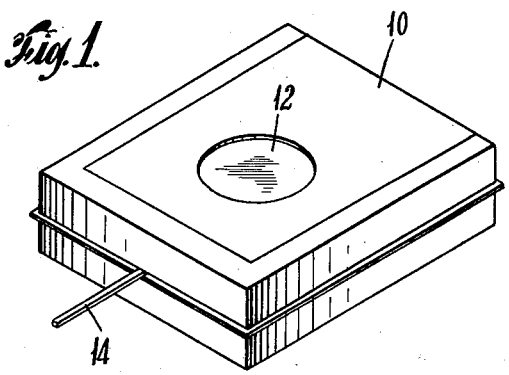
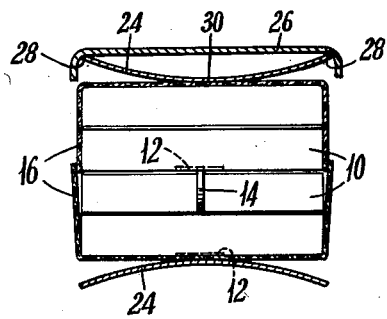
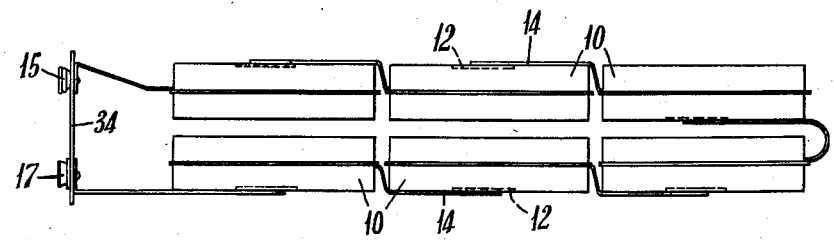
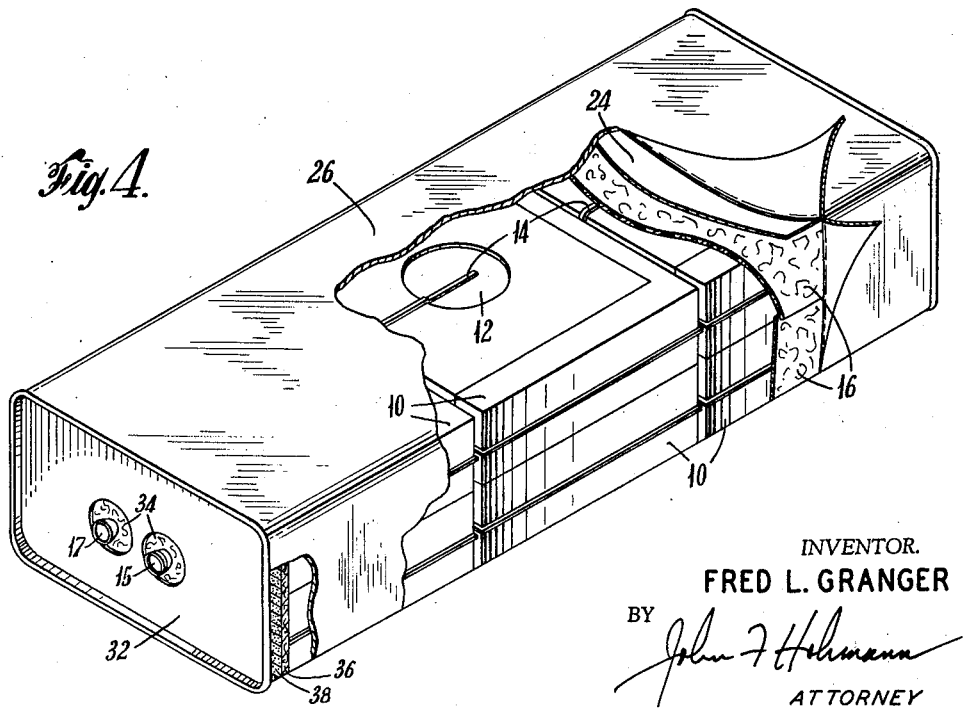
INVENTOR.
FRED L. GRANGER
BY John F. Hohmann
ATTORNEY

United States Patent Office 3,078,329
Patented Feb. 19, 1963

3,078,329
BATTERY ASSEMBLY
Fred L. Granger, Lakewood, Ohio, assignor to Union
Carbide Corporation, a corporation of New York
Filed Oct. 21, 1960, Ser. No. 64,222
4 Claims. (Cl. 136—108)

This invention relates to a battery of galvanic cells, and refers more particularly to a battery of galvanic cells of a type which have been referred to as the cathodic envelope type.

Modern, improved electronic equipment, out of necessity, demands a direct current power source which is compact and of such size and shape that it can easily be disposed of in the equipment, out of the way of its various components and yet be readily removed and replaced. Manufacturers of such equipment have found that a battery which is relatively thin and of a generally elongated shape is best suited for this purpose.

Excellent batteries for use in such modern electronic equipment would be batteries made from cathodic envelope unit cells, which have been developed recently. In such cells is embodied a new concept in a flat primary LeClanche Cell which is particularly well suited for heavy drain and low temperature service. A cathodic envelope cell comprises essentially a consumable metal anode, suitably of zinc, which is covered with a bibulous separator, an electrolyte wet depolarizer mix disposed on each side of the covered metal anode, a conductive plastic film cathode collector in contact with the depolarizer mix and a layer of metal foil in contact with the other side of the cathode collector, the whole cell being enveloped with a non-conductive, moisture impervious film and sealed tight at its edges. A positive terminal is provided by exposing through a part of the non-conductive film envelope, on at least one side of the cell, a portion of the metal foil adjacent the cathode collector film. A lead-out wire connected at one end to the metal anode constitutes the negative terminal of the cell.

Unfortunately, a problem exists in tying a group of such cells into a shape to form a battery, which means the demand for a compact, thin, and elongated direct current power source.

The method conventionally used in the battery art, for assembling flat cells to form a battery, is to stack a sufficient number of individual cells one on top of the other in the desired electrical arrangement to give the desired voltage. The stack is then tied firmly together by wrapping a band endwise about the stack. To assemble a battery having the desired compact, thin and elongated shape it is necessary to place the individual cells in a plurality of small stacks placed adjacent to each other in the desired electrical arrangement. When this is done the assembly of stacks cannot be tied together satisfactorily as a unit for the adjacent stacks would buckle when a tying band was drawn tight about them. Tying individual stacks for this purpose is costly and otherwise disadvantageous. Therefore, a new method of tying the cell stacks together had to be devised.

The principal object of the invention is to provide a battery of cathodic envelope cells, in an elongated flat shape which makes its use more readily adaptable to installation in many types of modern electronic equipment.

An equally important object of the invention is to provide a battery, made of cathodic envelope cells, which has its individual cell contacts accomplished by pressure means, thereby eliminating the need of soldering the contacts.

Broadly stated, the objects of the invention are accomplished by the novel battery of the invention wherein the cathodic envelope cells are placed one on top of each other in a plurality of small stacks, two or three cells high, and the stacks are placed adjacent each other with the terminals of the cells properly arranged to constitute a series, parallel or series-parallel battery as desired, the entire battery being inserted within a thin rigid metal or plastic elongated container or sleeve together with means for applying pressure to the assembly of stacks, transverse thereof, and tranverse to the container so as to transmit such pressure to the individual cells, thereby maintaining low resistance electrical contact between the cell terminals without any soldered connections, and without tying of the cells.

In order to more fully describe the invention, but in no way limiting it, reference is made to the accompanying drawings, wherein:

FIG. 1 is a perspective view of a cathodic envelope unit cell;

FIG. 2 shows a battery of cathodic envelope cells wherein the cells are electrically connected in series, and the electrical interconnection between the individual cells may be made by pressure means;

FIG. 3 is an end view of the cell assembly of FIG. 2 which in addition shows pressure means and part of the battery sleeve or container; and FIG. 4 is a three-dimensional view, part being broken away, of a complete battery of the invention, wherein the cells are arranged in series as shown in FIG. 2.

While the batteries illustrated in the drawing are limited to series connected cells, it is perfectly obvious to anyone skilled in the art that, the individual cells may be similaryl connected solely by pressure contacts in a parallel or series parallel arrangement.

Referring now to FIG. 1, there is shown a cathodic envelope unit cell 10 of the type described above. The cell 10 has a positive terminal 12, which consists of exposed metal foil at the top of the cell 10, and a negative terminal 14 which is a lead-out from he anode within the cell 10.

Referring now particularly to FIGS. 2 and 3, there is shown a series arrangement of cells for a battery in accordance with the invention. Although not limited thereto, the battery as shown consists of three cell stacks, adjacent to one another with two cells in each stack. The lead-out negative terminal 14 of each cell 10 is made to contact the positive terminal 12 of the adjacent cell in the next stack. As shown in FIG. 3 insulating covers 16, suitably of fiber board, of suitable shape are fitted over each side of the battery so that all electrical connections between the individual cells 10 are covered and insulated. The pressure means illustrated comprise a metal side plate 24 which resides at the top or at the top and bottom of the battery of cells and exerts pressure on the assembly of cell stacks, transverse thereof, and transverse to the container 26 so as to transmit such pressure to the individual cells 10 to maintain the low resistance electrical contact between the terminals of the respective cells when the battery is inserted within the container 26. The side plate 24 may take a variety of shapes provided the shape employed is one that is adapted to exert a transverse pressure suitably on the cell stacks and the can 26 when it is positioned between the side walls of the can 26 and the cell stacks. The thickness or gauge of the side plate 24 will, of course, depend upon the size of the cell stacks and the thickness of the individual cells 10, that is to say, the side plates 24 should have a sufficient rigidity to exert a transverse pressure on the cell stacks and the container 26 which will maintain the terminals 12 and 14 of the individual cells 10 in low resistance electrical contact.

Preferably, as shown in FIG. 3, the side plates 24 are designed to have three points of contact with the container 26 and the cell stacks in order to exert an optimum transverse pressure on the cell stacks, and the container 26, one of the points being in each corner 28 of the container 26 and the other at the center 30 of the cell stacks. This latter contact of the side plate 24 with the center 30 of the stacks is essential to compress the terminal leads 14 against the metal foil terminals 12 of each cell 10 in the cell stacks. While a metal side plate is shown in the drawing, a plastic side plate, suitably of high impact polystyrene, for example, may also be employed. In this embodiment, the insulating side covers 16 may be dispensed with.

Referring again to FIG. 2, terminal posts 15 and 17 are attached to an insulating plate 34 and are also electrically connected to the battery before final assembly in the container 26.

Referring now to FIG. 4, there is shown the final assembly of a series stacked battery assembly in accordance with the invention. The technique of "canning" the battery assembly includes positioning the cells 10 in stacks with their terminals 12 and 14 connected electrically as desired, placing the insulating cover 16 over the stacks and the metal side plates 24 over said insulating cover 16 and inserting the assembly in the rigid metal or plastic container 26. An insulating board 36, suitably of cardboard, is then placed against the end of the last cell stack within the container 26, with the terminal leads of the battery passing through holes provided in the insulating board 36. Liquid asphalt or other like sealing material 38 is then poured in the open end of the container 26 on top of this insulating board 36 and around the terminal leads and allowed to dry. These terminal leads are then electrically connected to the terminal posts 15, 17 which are attached to an insulating plate 34, suitably of fiber board. A cover 32 is then provided for the open end of the container 26 and sealed, suitably by spinning the edge of the cover 32 over that of the container 26. If desired, a metal or plastic sleeve may be utilized rather than a container and in that event, the non-terminal end of the sleeve may be suitably closed by spinning the sleeve over onto a bottom member. The terminal posts 15, 17 protrude through openings in the cover 32 which are larger than the terminal posts 15, 17 so that the terminal posts 15, 17 do not touch and short out through the cover 32. The width of the container 26 is slightly smaller than the width of the battery of cells together with the fiber board insulating covers 16 and the side plates 24 in place prior to "canning" so that when this unit is inserted in the container 26, the side plates 24 are compressed and exert a continuous spring-like pressure to the assembly of stacks, transverse thereof, and transverse to the container thereby transmitting such pressure to the individual cells and maintaining low resistance electrical contact between all the cell terminals without any soldered connections, while at the same time firmly grouping the cells together without any tying being required. The exertion of this continuous pressure is essential for good electrical contact between the adjacent cathodic envelope cells inasmuch as these cells have an inherent plasticity or resiliency which must be compensated for by the continuous pressure means if good inter-cell contact is to be maintained purely by pressure means.

The technique of "canning" a battery assembly of cathodic envelope cells in accordance with the invention embodies several advantages among which are the following: (1) the technique permits the assembly of a battery into an elongated-flat shape which makes its use more readily adaptable to installation in many types of modern electronic equipment; (2) good electrical contacts in the cell stacks are insured by a continuous pressure means; (3) the cells may be stacked in series, parallel or series-parallel, using the wire anode lead to fullest advantage; (4) the metal or plastic side plates supply constant spring pressure to the cells and the strain of maintaining the pressure is transmitted to the sides of the container by proper shaping of the metal side plates; and (5) the container acts as a tying medium which prevents buckling of the cell stacks, and at the same time minimizes the sealing problems formerly associated with series stacking of flat cells.

This application is a continuation in part of U.S. Serial No. 728,950, filed April 16, 1958, by F. L. Granger and now abandoned.

I claim:

1. A compact, thin battery of inherently resilient cathodic envelope cells arranged in a plurality of adjacent positioned stacks and having their terminals interconnected in low electrical resistance, said plurality of cells being contained within a rigid rectangular container characterized by a greater length than height and having a spring-like side plate of a concavo-convex shape interposed adjacent to one side and coextensive with said cell stacks, said side plate contacting said cell stacks and having longitudinal edges abutting the corners of said container whereby a continuous pressure is exerted on said adjacently positioned stacks transverse thereof and transverse of said container such that a continuous pressure is transmitted to said contact terminals to maintain same in low electrical resistance contact.

2. The compact thin battery of claim 1 wherein said container is a metal sleeve and said side plate is plastic and is provided on both sides of said cell stacks.

3. The compact thin battery of claim 1 wherein said container is a cupped container, said side plate is metal and is provided on both sides of said cell stacks, and insulating covers are provided between said side plates and said cell stacks.

4. A compact, thin battery of inherently resilient cathodic envelope cells arranged in a plurality of adjacently positioned stacks and having their terminals interconnected in low electrical resistance, said plurality of cells being contained within a rigid rectangular container characterized by a greater length than height and having a spring-like side plate of a concavo-convex shape interposed adjacent to one side and coextensive with said cell stacks, said side plate contacting one side of said cell stacks and having longitudinal edges abutting the corners of said container, the other side of said cell stacks bearing against an opposite side of said container, said side plate maintaining a continuous pressure on said adjacently positioned stacks transverse thereof and transverse of said container such that a continuous pressure is transmitted to said contact terminals to maintain same in low electrical resistance contact.

References Cited in the file of this patent

UNITED STATES PATENTS

| | | |
|---|---|---|
| 1,327,017 | Boltshauser | Jan. 6, 1920 |
| 1,467,240 | Doe | Sept. 4, 1923 |
| 2,870,235 | Soltis | Jan. 20, 1956 |